United States Patent
Kimura et al.

(10) Patent No.: US 7,514,486 B2
(45) Date of Patent: Apr. 7, 2009

(54) VIBRATION DAMPING RUBBER COMPOSITION

(75) Inventors: Norihito Kimura, Kasugai (JP); Fumihiko Jinno, Kasugai (JP); Takehiko Taguchi, Komaki (JP)

(73) Assignee: Tokai Rubber Industries, Ltd., Komaki-shi (JP)

( * ) Notice: Subject to any disclaimer, the term of this patent is extended or adjusted under 35 U.S.C. 154(b) by 361 days.

(21) Appl. No.: 11/387,779

(22) Filed: Mar. 24, 2006

(65) Prior Publication Data

US 2006/0217468 A1    Sep. 28, 2006

(30) Foreign Application Priority Data

Mar. 28, 2005   (JP)   ............... 2005-092279

(51) Int. Cl.
*C08K 5/34* (2006.01)
(52) U.S. Cl. ..................... 524/105; 524/543
(58) Field of Classification Search .............. 52/105; 524/105
See application file for complete search history.

(56) References Cited

U.S. PATENT DOCUMENTS 2,989,504 A * 6/1961 Little ................... 525/151
3,219,891 A   11/1965 Benedict

FOREIGN PATENT DOCUMENTS

DE   690 06 788 T2   7/1989
JP   2-284935   11/1990
JP   3-54235   3/1991
JP   4-136049   5/1992

OTHER PUBLICATIONS

Office Action dated Jun. 27, 2007 issued in corresponding German Application No. 10 2006 014 059.1-43.

* cited by examiner

*Primary Examiner*—Kriellion A Sanders
(74) *Attorney, Agent, or Firm*—Westerman, Hattori, Daniels & Adrian, LLP.

(57) ABSTRACT

A vibration damping rubber composition having an excellent vibration damping performance includes the following (A) to (C) as essential components:
(A) a diene-based rubber;
(B) a vulcanizing agent of a bismaleimide compound represented by the following formula (1):

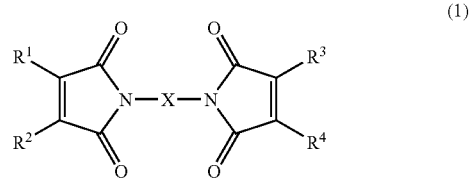

(1)

[wherein X denotes a hydrocarbon group having an aromatic ring in its molecular structure or an aromatic hydrocarbon group and may or may not have a substituent; and $R^1$ to $R^4$ may be the same or different and each denote a hydrogen atom, an alkyl group, $-NH_2$, or $-NO_2$], wherein the vulcanizing agent is sulfur-free; and
(C) a vulcanization accelerator.

6 Claims, No Drawings

VIBRATION DAMPING RUBBER COMPOSITION

BACKGROUND OF THE INVENTION

1. Field of the Invention

The present invention relates to vibration damping rubber compositions, more specifically, relates to vibration damping rubber compositions used on engine mounts or the like, which function as a support for automobile engines and suppress vibration transmission.

2. Description of the Art

In conventional vibration damping rubber compositions, for example, rubber compositions prepared by adding a sulfur-vulcanizing agent and a vulcanization accelerator to a rubber material, such as a natural rubber and a synthetic rubber, have been used. However, such rubber compositions have a disadvantage that the rubbers harden due to long-term service (heat aging) causing a decrease in the vibration damping performance.

The causes of such heat aging deterioration are thought as follows: (a) an increase in cross-linking density by a change in a form of sulfur cross-linking from a polysulfide bond to a disulfide or monosulfide bond; (b) oxidative deterioration of the rubber material itself; and (c) cross-linking caused by the sulfur-vulcanizing agent.

These problems have been dealt with by, for example, (a) forming a monosulfide-rich cross-link, (b) adding an antioxidant, and (c) minimizing the blend ratio of the sulfur-vulcanizing agent. However, the hardening of the rubber due to long-term service (heat aging) could not be sufficiently suppressed. Therefore, the vibration damping performance was poor.

Consequently, in order to solve the problems in the vibration damping performance, a variety of rubber compositions using a bismaleimide-based compound as the vulcanizing agent have been proposed (for example, Japanese Unexamined Patent Publication No. 2-284935, Japanese Unexamined Patent Publication No. 4-136049, and Japanese Patent Publication No. 7-122006).

However, each of the rubber compositions described in the above-mentioned three Patent Publications includes a sulfur-vulcanizing agent along with a bismaleimide-based compound. Therefore, the cross-linking progresses by the sulfur-vulcanizing agent to harden the rubber. Thus, such rubber compositions have a disadvantage that sufficient vibration damping performance cannot be achieved.

The present invention has been made in view of the above-mentioned circumstances, and it is an object of the present invention to provide a vibration damping rubber composition which can achieve excellent vibration damping performance.

SUMMARY OF THE INVENTION

In order to achieve the above-mentioned object, a vibration damping rubber composition according to the present invention includes the following (A) to (C) as essential components:

(A) a diene-based rubber;

(B) a vulcanizing agent of a bismaleimide compound represented by the following formula (1):

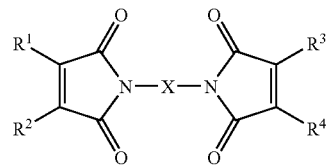

[wherein X denotes a hydrocarbon group having an aromatic ring in its molecular structure or an aromatic hydrocarbon group and may or may not have a substituent; and $R^1$ to $R^4$ may be the same or different and each denote a hydrogen atom, an alkyl group, $-NH_2$, or $-NO_2$], wherein the vulcanizing agent is sulfur-free; and (C) a vulcanization accelerator.

Namely, the present inventors have intensively studied in order to obtain a vibration damping rubber composition which can achieve excellent vibration damping performance and have focused on a vulcanization system wherein only a particular bismaleimide compound is used as a vulcanizing agent that is sulfur-free. The inventors have found that in this vulcanization system a vulcanization accelerator is required to be used along with a bismaleimide compound for improving cross-linking reactivity of the bismaleimide compound as the vulcanizing agent. As a result, the inventors have finally found that the desired purpose can be achieved by a vibration damping rubber composition including a diene-based rubber, a particular bismaleimide compound as a vulcanizing agent not containing elemental sulfur, and a vulcanization accelerator. Thus, the present invention has been completed.

The vibration damping rubber composition according to the present invention includes a particular bismaleimide compound not containing elemental sulfur as a vulcanizing agent and includes a vulcanization accelerator. Therefore, the hardening of the rubber due to long-term service (heat aging) can be sufficiently suppressed and excellent vibration damping performance can be achieved. Additionally, since the vibration damping rubber composition according to the present invention includes a particular bismaleimide compound as a vulcanizing agent, the cross-linking with the diene-based rubber is formed by a C—C bond of which binding energy is larger than that of a sulfide bond in sulfur cross-linkage. Therefore, excellent heat resistance can be achieved.

With respect to the vulcanization accelerator, in particular, by using a thiazole-based vulcanization accelerator, the cross-linking reactivity can be improved.

Furthermore, with respect to the thiazole-based vulcanization accelerator, in particular, the cross-linking reactivity can be further improved by using dibenzothiazyl disulfide (MBTS) or 2-(4-morpholinodithio)benzothiazole (MDB).

Additionally, with respect to the vulcanization accelerator, in particular, by using a thiuram-based vulcanization accelerator, a scorch time can be increased. Consequently, excellent storage stability in an unvulcanized rubber condition can be achieved and rubber-burning during the vulcanization process can be further suppressed. As a result, excellent workability can be obtained.

DESCRIPTION OF THE PREFERRED EMBODIMENTS

The embodiments according to the present invention will now be described in detail.

The vibration damping rubber composition according to the present invention can be prepared by using a diene-based rubber (component A), a particular bismaleimide compound (component B), and a vulcanization accelerator (component C).

In the present invention, it is the distinguishing characteristic that the vibration damping rubber composition includes the particular bismaleimide compound (component B) alone as a vulcanizing agent not containing elemental sulfur. Here, the elemental sulfur means sulfur which is commonly used in rubber vulcanization.

Examples of the diene-based rubber (component A) include, but are not limited to, natural rubbers (NR), isoprene rubbers (IR), butadiene rubbers (BR), styrene-butadiene rubbers (SBR), and acrylonitrile-butadiene rubbers (NBR). These rubbers may be used alone or in combination thereof. Among these rubbers, NR is preferable from the viewpoints of vibration damping performance and durability.

The particular bismaleimide compound (component B) used with the diene-based rubber (component A) is represented by the following formula (1):

(1)

[wherein X denotes a hydrocarbon group having an aromatic ring in its molecular structure or an aromatic hydrocarbon group and may or may not have a substituent; and $R^1$ to $R^4$ may be the same or different and each denote a hydrogen atom, an alkyl group, —$NH_2$, or —$NO_2$].

In formula (1), X denotes a hydrocarbon group having an aromatic ring in its molecular structure or an aromatic hydrocarbon group. Examples of the hydrocarbon group include alkylene groups such as a methylene group. The number of the aromatic ring of the hydrocarbon group is not limited to one and may be two or more and each aromatic ring may be bonded by —O—, —S—, —SS—, $SO_2$— or the like.

In formula (1), X may have a substituent. For example, the hydrocarbon group, the aromatic group or the aromatic hydrocarbon group may have a substituent. Examples of the substituent include alkyl groups (preferably, lower alkyl groups such as a methyl group, an ethyl group, and a propyl group), —$NO_2$, —$NH_2$, —F, —Cl and —Br.

In formula (1), examples of the alkyl group represented by $R^1$ to $R^4$ include lower alkyl groups having 1 to 5 carbon atoms such as a methyl group, an ethyl group, and a propyl group.

Examples of the particular bismaleimide compound (component B) include N,N'-m-phenylenedimaleimide, N,N'-(4,4,-diphenyl-methane)bismaleimide, bis(3-ethyl-5-methyl-4-maleimidephenyl)methane, 2,2'-bis[4-(4-maleimide phenoxy) phenyl]propane, m-phenylenebis(methylene)bismaleimide, and m-phenylenebis(methylene)biscitraconimide represented by the following chemical formulae (2) to (7), respectively.

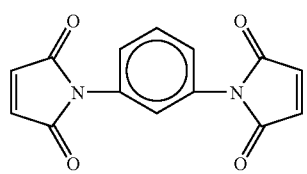

(2)

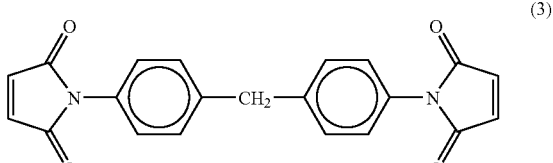

(3)

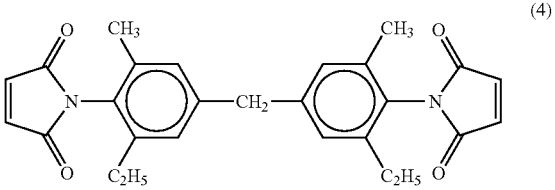

(4)

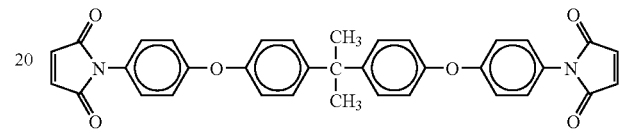

(5)

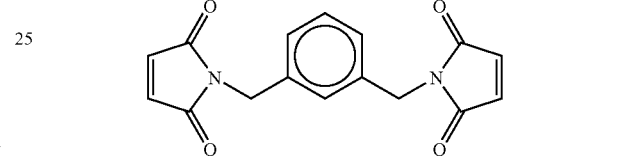

(6)

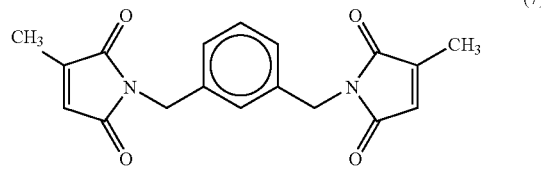

(7)

Among the above-mentioned particular bismaleimide compounds (component B), N,N'-m-phenylenedimaleimide represented by chemical formula (2) can be prepared, for example, as follows; Adding a predetermined amount of m-phenylenediamine dropwise to a chloroform solution of anhydrous maleic acid; mixing the resulting bis(maleic acid) m-phenyleneamide, triethylamine, and sodium acetate with acetone to yield the target compound.

The blend ratio of the particular bismaleimide compound (component B) is preferably 0.3 to 7 parts by weight (hereinafter referred to as simply "parts") and more preferably 1 to 5 parts per 100 parts of the diene-based rubber (component A). Namely, when the blend ratio of the component B is lower than 0.3 parts, the cross-linking reactivity tends to decrease. Reversely, when the blend ratio of the component B is higher than 7 parts, the physical properties (tensile strength at break and elongation at break) decrease; which may cause a decrease in durability.

Any vulcanization accelerator (component C) can be used with the component A and the component B. Examples of the vulcanization accelerator include thiazole compounds, sulfenamide compounds, thiuram compounds, aldehyde ammonia compounds, aldehyde amine compounds, guanidine compounds, and thiourea compounds. These vulcanization accelerators may be used alone or in combination thereof. Among them, the thiazole-based vulcanization accelerator is preferable because of its excellent cross-linking reactivity. Additionally, a combination of the thiazole-based vulcanization accelerator and the thiuram-based vulcanization accelerator is preferable because of its excellent physical properties (tensile strength at break and elongation at break).

Examples of the thiazole-based vulcanization accelerator include dibenzothiazyl disulfide (MBTS), 2-(4-morpholinodithio)benzothiazole (MDB), 2-mercaptobenzothiazole (MBT), 2-mercaptobenzothiazole sodium salt (NaMBT), and 2-mercaptobenzothiazole zinc salt (ZnMBT). These thiazole-based vulcanization accelerators may be used alone or in combination thereof. Among them, MBTS and MDB are preferable because of their excellent cross-linking reactivity. In particular, MDB is preferable because of its excellent physical properties (tensile strength at break and elongation at break).

Examples of the sulfenamide-based vulcanization accelerator include N-cyclohexyl-2-benzothiazyl sulfenamide (CBS).

Examples of the thiuram-based vulcanization accelerator include tetramethylthiuram disulfide (TMTD).

The blend ratio of the vulcanization accelerator (component C) is preferably 0.3 to 7 parts and more preferably 0.5 to 5 parts per 100 parts of the diene-based rubber (component A). Namely, when the blend ratio of the component C is lower than 0.3 parts, the cross-linking reactivity tends to decrease. Reversely, when the amount of the component C is higher than 7 parts, the physical properties (tensile strength at break and elongation at break) may decrease.

In addition to the above-mentioned components A to C, the vibration damping rubber composition according to the present invention may properly contain a vulcanizing aid, an antioxidant, a processing aid, a softener, and the like, if necessary.

Examples of the vulcanizing aid include, but are not limited to, zinc oxide (ZnO) and magnesium oxide. These vulcanizing aids may be used alone or in combination thereof.

The blend ratio of the vulcanizing aid is preferably 1 to 15 parts and more preferably 2 to 10 parts per 100 parts of the diene-based rubber (component A).

Examples of the antioxidant include carbamate antioxidants, phenylenediamine antioxidants, phenol antioxidants, diphenylamine antioxidants, quinoline antioxidants, imidazole antioxidants, and waxes.

The blend ratio of the antioxidant is preferably 1 to 7 parts and more preferably 2 to 5 parts per 100 parts of the diene-based rubber (component A).

Examples of the processing aid include stearic acid, fatty esters, fatty acid amides, and hydrocarbon resins.

The blend ratio of the processing aid is preferably 1 to 5 parts and more preferably 1 to 3 parts per 100 parts of the diene-based rubber (component A).

The vibration damping rubber composition according to the present invention can be prepared, for example, by blending a diene-based rubber (component A), a particular bismaleimide compound (component B), a vulcanization accelerator (component C), and additives such as a vulcanizing aid therein if necessary, and kneading the mixture by using a mixing roll, a Banbury mixer, or the like.

The thus prepared vibration damping rubber composition according to the present invention can be suitably used as a vibration damping material for, but is not limited to, engine-mounts, stabilizer bushings, and suspension bushings used in vehicles such as automobiles.

Vibration damping rubber using the vibration damping rubber composition according to the present invention can be produced, for example, by press-vulcanizing the thus prepared vibration damping rubber composition under predetermined conditions and forming the thus obtained product into a predetermined shape.

EXAMPLES

Examples and Comparative Examples will now be described.

The materials shown below were prepared for the Examples and the Comparative Examples.

Diene-Based Rubber
  Natural rubber

Diene-Based Rubber
  Butadiene rubber (BR)

Diene-Based Rubber
  Styrene-butadiene rubber (SBR)

Antioxidant A
  N-(1,3-dimethylbutyl)-N'-phenyl-p-phenylenediamine (OZONONE 6C: Seiko Chemical Co., Ltd.)

Antioxidant B
  2,2,4-trimethyl-1,2-dihydroquinoline (NONFLEX RD: Seiko Chemical Co., Ltd.)

Carbon Black
  FEF (Fast Extruding Furnace) type carbon black (SEAST SO: Tokai Carbon Co., Ltd.)

Softener
  Naphthenic mineral oil

Bismaleimide Compound A
  N,N'-m-phenylenedimaleimide (VULNOC PM: Ouchi-Shinko Chemical Industrial Co., Ltd.) represented by chemical formula (2)

Bismaleimide Compound B
  N,N'-(4,4,-diphenyl-methane)bismaleimide (BMI-S: Mitsui Fine Chemicals, Inc.) represented by chemical formula (3)

Bismaleimide Compound C
  Bis(3-ethyl-5-methyl-4-maleimidephenyl)methane (BMI-70: K•I Chemical Industry Co., Ltd.) represented by chemical formula (4)

Bismaleimide Compound D
  2,2'-bis[4-(4-maleimide phenoxy)phenyl] propane (BMI-80: K•I Chemical Industry Co., Ltd.) represented by chemical formula (5)

Bismaleimide Compound E
  M-phenylenebis(methylene)bismaleimide represented by chemical formula (6)

Bismaleimide Compound F
  M-phenylenebis(methylene)biscitraconimide represented by chemical formula (7)

Vulcanizing Agent
  Sulfur

Vulcanization Accelerator (MBTS)
  Sanceler DM: Sanshin Chemical Industry Co., Ltd.

Vulcanization Accelerator (CBS)
  Sanceler CM: Sanshin Chemical Industry Co., Ltd.

Vulcanization Accelerator (TMTD)
  Sanceler TT: Sanshin Chemical Industry Co., Ltd.

Vulcanization Accelerator (MDB)
  NOCCELER MDB: Ouchi Shinko Chemical Industrial Co., Ltd.

The vibration damping rubber compositions were prepared by using these materials as described below.

Examples 1 to 17 and Comparative Examples 1 and 2

Each material shown in Tables 1 to 3 below was blended at the ratios shown in the Tables, and the resulting blend was kneaded using a Banbury mixer to prepare vibration damping rubber compositions.

Characteristics of the thus prepared vibration damping rubber compositions for the Examples and the Comparative Examples were evaluated according to the following criteria. The Tables 1 to 3 also show the results.

Workability

Workability of each vibration damping rubber composition was evaluated by measuring scorch time ($t_5$) at a testing temperature of 125° C. according to the test method of JIS K 6300. The material was graded as ◎ when the scorch time ($t_5$) was longer than 13 minutes and was graded as ○ when the scorch time ($t_5$) was 13 minutes or less.

Initial Physical Property

Each vibration damping rubber composition was press-vulcanized at 160° C. for 30 minutes and then was punched out using a JIS No. 5 dumbbell to prepare vibration damping rubber sheets having a thickness of 2 mm. The tensile strength at break, the elongation at break, and the hardness (JIS A) of each vibration damping rubber sheet were evaluated in conformity with JIS K 6251.

Heat Aging Property

Using vibration damping rubber sheets prepared by the same manner as described above, the elongation at break. and hardness (JIS A) were measured after aging at 100° C. for 500 hours. The change rate (%) of the elongation at break was determined for the elongation at break after heat aging while the difference from the initial hardness was determined for the hardness after heat aging.

Spring Change

Stress at 100% elongation of vibration damping rubber sheets prepared by the same manner as described above was measured in conformity with JIS K 6251 and 100% modulus change rate (%) was determined.

Durability

Each vibration damping rubber composition was press-vulcanized at 160° C. for 30 minutes to prepare test pieces and was subjected to a flexing test in conformity with JIS K 6260 to measure the number of flexing cycles until the cracking size reached 5 mm.

TABLE 1

| | | (parts by weight) Example | | | | | | |
|---|---|---|---|---|---|---|---|---|
| | | 1 | 2 | 3 | 4 | 5 | 6 | 7 |
| Natural rubber | | 100 | 100 | 100 | 100 | 100 | 100 | 100 |
| Stearic acid | | 1 | 1 | 1 | 1 | 1 | 1 | 1 |
| ZnO | | 5 | 5 | 5 | 5 | 5 | 5 | 5 |
| Antioxidant A | | 2 | 2 | 2 | 2 | 2 | 2 | 2 |
| Antioxidant B | | 2 | 2 | 2 | 2 | 2 | 2 | 2 |
| Carbon black | | 40 | 40 | 40 | 40 | 40 | 40 | 40 |
| Softener | | 5 | 5 | 5 | 5 | 5 | 5 | 5 |
| Bismaleimide compound | Blend ratio | 2 | 2 | 2 | 2 | 2 | 2 | 0.3 |
| | Type | A | B | C | D | E | F | A |
| Vulcanizing agent (sulfur) | | — | — | — | — | — | — | — |
| Vulcanization accelerator (MBTS) | | 2 | 2 | 2 | 2 | 2 | 2 | 2 |
| Vulcanization accelerator (CBS) | | — | — | — | — | — | — | — |
| Vulcanization accelerator (TMTD) | | — | — | — | — | — | — | — |
| Vulcanization accelerator (MDB) | | — | — | — | — | — | — | — |
| Workability | | ○ | ○ | ○ | ○ | ○ | ○ | ○ |
| Initial physical property | Tensile strength at break (MPa) | 17 | 17 | 16 | 16 | 16 | 16 | 17 |
| | Elongation at break (%) | 490 | 520 | 530 | 550 | 510 | 490 | 550 |
| | Hardness (JIS A) | 55 | 54 | 53 | 53 | 54 | 55 | 53 |
| Heat aging Property | Change rate of elongation at break (%) | −18 | −16 | −15 | −19 | −18 | −19 | −16 |
| | Hardness change (from the initial hardness) | +1 | +1 | +1 | +1 | +1 | +1 | +1 |
| | Spring change: 100% modulus change rate (%) | +22 | +20 | +19 | +21 | +21 | +18 | +18 |
| Durability | Number of flexing cycles until the cracking size reaches 5 mm (×10000) | 150 | 180 | 180 | 200≦ | 200≦ | 200≦ | 200≦ |

TABLE 2

| | (parts by weight) Example | | | | | | |
|---|---|---|---|---|---|---|---|
| | 8 | 9 | 10 | 11 | 12 | 13 | 14 |
| Natural rubber | 100 | 100 | 100 | 100 | 100 | 100 | 100 |
| Stearic acid | 1 | 1 | 1 | 1 | 1 | 1 | 1 |
| ZnO | 5 | 5 | 5 | 5 | 5 | 5 | 5 |

TABLE 2-continued

| | | (parts by weight) Example | | | | | | |
|---|---|---|---|---|---|---|---|---|
| | | 8 | 9 | 10 | 11 | 12 | 13 | 14 |
| Antioxidant A | | 2 | 2 | 2 | 2 | 2 | 2 | 2 |
| Antioxidant B | | 2 | 2 | 2 | 2 | 2 | 2 | 2 |
| Carbon black | | 40 | 40 | 40 | 40 | 40 | 40 | 40 |
| Softener | | 5 | 5 | 5 | 5 | 5 | 5 | 5 |
| Bismaleimide compound | Blend ratio | 7 | 2 | 2 | 2 | 2 | 2 | 2 |
| | Type | A | A | A | A | A | A | A |
| Vulcanizing agent (Sulfur) | | — | — | — | — | — | — | — |
| Vulcanization accelerator (MBTS) | | 2 | 0.3 | 7 | — | — | — | — |
| Vulcanization accelerator (CBS) | | — | — | — | — | — | — | — |
| Vulcanization accelerator (TMTD) | | — | — | — | 0.1 | 1 | 3 | — |
| Vulcanization accelerator (MDB) | | — | — | — | — | — | — | 2 |
| Workability | | ○ | ○ | ○ | ◎ | ◎ | ◎ | ◎ |
| Initial physical property | Tensile strength at break (MPa) | 15 | 16 | 15 | 18 | 18 | 17 | 19 |
| | Elongation at break (%) | 410 | 540 | 390 | 570 | 580 | 530 | 590 |
| | Hardness (JIS A) | 56 | 53 | 56 | 53 | 55 | 57 | 57 |
| Heat aging property | Change rate of elongation at break (%) | −15 | −18 | −18 | −20 | −22 | −27 | −27 |
| | Hardness change (from the initial hardness) | +1 | +1 | +1 | +1 | +1 | +2 | +2 |
| | Spring change: 100% modulus change rate (%) | +17 | +18 | +18 | +20 | +24 | +28 | +25 |
| Durability | Number of flexing cycles until the cracking size reaches 5 mm (×10000) | 200≦ | 150 | 180 | 200≦ | 200≦ | 180 | 200≦ |

TABLE 3

| | | (parts by weight) | | | | |
|---|---|---|---|---|---|---|
| | | Example | | | Comparative Example | |
| | | 15 | 16 | 17 | 1 | 2 |
| Natural rubber | | 50 | 50 | 100 | 100 | 100 |
| Butadiene rubber | | 50 | — | — | — | — |
| SBR | | — | 50 | — | — | — |
| Stearic acid | | 1 | 1 | 1 | 1 | 1 |
| ZnO | | 5 | 5 | 5 | 5 | 5 |
| Antioxidant A | | 2 | 2 | 2 | 2 | 2 |
| Antioxidant B | | 2 | 2 | 2 | 2 | 2 |
| Carbon black | | 40 | 40 | 40 | 40 | 40 |
| Softener | | 5 | 5 | 5 | 5 | 5 |
| Bismaleimide compound | Blend ratio | 2 | 2 | 2 | — | 2 |
| | Type | A | A | A | — | A |
| Vulcanizing agent (Sulfur) | | — | — | — | 3 | 3 |
| Vulcanization accelerator (MBTS) | | 2 | 2 | 2 | — | — |
| Vulcanization accelerator (CBS) | | — | — | — | 1 | — |
| Vulcanization accelerator (TMTD) | | — | — | 1 | 1 | — |
| Vulcanization accelerator (MDB) | | — | — | — | — | — |
| Workability | | ○ | ○ | ◎ | ◎ | ◎ |
| Initial physical property | Tensile strength at break (MPa) | 16 | 17 | 19 | 18 | 18 |
| | Elongation at break (%) | 500 | 510 | 590 | 500 | 490 |
| | Hardness (JIS A) Change | 56 | 56 | 56 | 57 | 57 |
| Heat aging property | Change rate of elongation at break (%) | −19 | −20 | −20 | −70 | −50 |
| | Hardness change (from the initial hardness) | +1 | +1 | +1 | +7 | +5 |
| | Spring change: 100% modulus change rate (%) | +18 | +18 | +21 | +80 | +70 |
| Durability | Number of flexing cycles until the cracking size reaches 5 mm (×10000) | 170 | 200≦ | 200≦ | 100 | 130 |

It was confirmed from the above-mentioned results that the compositions of Examples 1 to 17 were excellent in workability, initial physical property, heat aging property, and durability.

On the other hand, in the composition in Comparative Example 1, which did not contain a bismaleimide compound as the vulcanizing agent and contained a sulfur-vulcanizing agent only, change rate of the elongation at break and hardness change after the heat aging and the spring change were large; thus the vibration damping performance was poor. In the composition in Comparative Example 2, which contained a bismaleimide compound as the vulcanizing agent and simultaneously contained the sulfur-vulcanizing agent, the spring change was large; thus the vibration damping performance was poor.

The vibration damping rubber compositions according to the present invention can be suitably used as vibration damping materials for engine-mounts, stabilizer bushings, and suspension bushings used in vehicles such as automobiles.

What is claimed is:

1. A vibration damping rubber composition comprising:
   a diene-based rubber;
   a vulcanizing agent of a bismaleimide compound selected from the group consisting of
   N,N'(4,4,-diphenyl-methane) bismaleimide represented by the following chemical formula (3), bis (3-ethyl-5-methyl-4-maleimidephenyl)methane represented by the following chemical formula (4), 2,2'-bis [4-(4-maleimide phenoxy) phenyl]propane represented by the following chemical formula (5), m-phenylenebis(methylene) bismaleimide represented by the following chemical formula (6), and m-phenylenebis (methylene) biscitraconimide represented by the following chemical formula (7), (3)

(4)

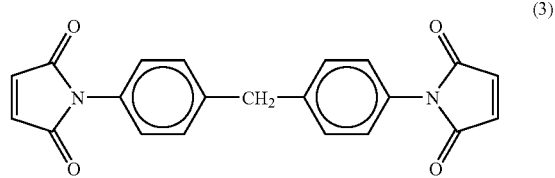

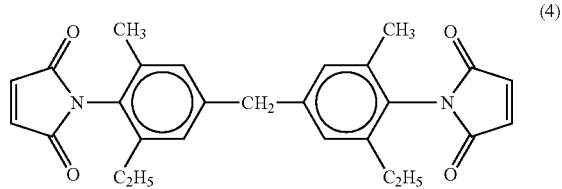

(5)

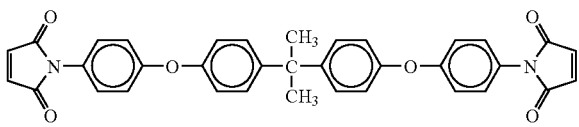

(6)

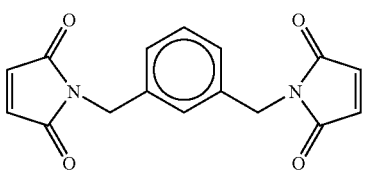

(7)

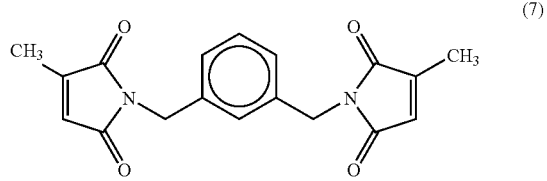

wherein the vulcanizing agent is sulfur-free; and
a vulcanization accelerator.

2. The vibration damping rubber composition according to claim 1, wherein the vulcanization accelerator is a thiazole-based vulcanization accelerator.

3. The vibration damping rubber composition according to claim 2, wherein the thiazole-based vulcanization accelerator is dibenzothiazyl disulfide or 2-(4-morpholinodithio)benzothiazole.

4. The vibration damping rubber composition according to claim 1, wherein the vulcanization accelerator is thiuram-based vulcanization accelerator.

5. The vibration damping rubber composition according to claim 1, wherein a thiazole-based vulcanization accelerator and a thiuram-based vulcanization accelerator are used in combination.

6. The vibration damping rubber composition according to claim 1, wherein the diene-based rubber is at least one selected from a group consisting of natural rubbers, isoprene rubbers, butadiene rubbers, styrene-butadiene rubbers, and acrylonitride-butadien rubbers.

* * * * *